Figure 1:
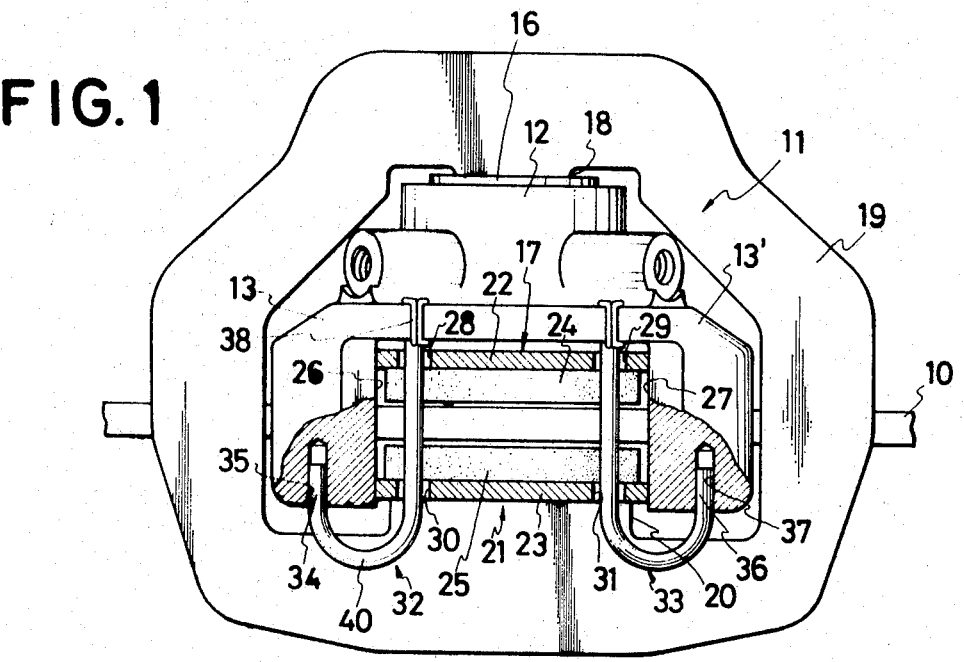

United States Patent

[11] 3,621,946

| [72] | Inventor | Yoshinori Mori<br>Toyota, Japan |
|---|---|---|
| [21] | Appl. No. | 885,749 |
| [22] | Filed | Dec. 17, 1969 |
| [45] | Patented | Nov. 23, 1971 |
| [73] | Assignee | Aisin Seiki Kabushiki Kaisha<br>Kariza, Japan |
| [32] | Priority | Dec. 28, 1968 |
| [33] | | Japan |
| [31] | | 44/1558 |

[54] BRAKE SHOE SUPPORTERS
5 Claims, 2 Drawing Figs.

[52] U.S. Cl. .................................................. 188/73.6
[51] Int. Cl. .................................................. F16d 65/04
[50] Field of Search .......................................... 188/72.1,
72.2, 72.4, 72.5, 72.6, 73.3, 73.4, 73.6

[56] References Cited
UNITED STATES PATENTS

| 3,189,129 | 6/1965 | Burnett ........................ | 188/73.6 |
| 3,245,500 | 4/1966 | Hambling et al. ............. | 188/73.4 X |
| 3,402,790 | 9/1968 | Rath ............................. | 188/72.5 |

FOREIGN PATENTS

| 969,866 | 9/1964 | Great Britain ................. | 188/73.4 |

Primary Examiner—George E. A. Halvosa
Attorney—Pierce, Scheffler & Parker

ABSTRACT: Brake shoe supporting pins for use on a spot-type disk brake which are substantially J-shaped pins and are fixed to stationary members on opposite sides of the brake disk. The stationary members may be the housing of an operating cylinder on one side of the brake disk and yoke members extending to the other side of the brake disk.

PATENTED NOV 23 1971  3,621,946

INVENTOR.
Yoshinori Mori
BY
Pierce, Schiffler & Parker
Attorneys

BRAKE SHOE SUPPORTERS

This invention relates to brake shoe supports for use on spot-type disk brake, more particularly, this invention concerns support pins which guide brake shoes of this type brake in the axial direction of the brake disk when hydraulic pressure is applied or released.

Conventionally, a pair of support pins have been provided substantially in parallel relationship to each other to retain brake shoes against radial movement, and their inner ends are fixed to the cylinder member while their outer ends are rigidly mounted on a bar plate or projecting lug which is attached to yoke portions of the cylinder member. This is not economical and requires difficult assemblage of parts. In order to overcome the above drawbacks, there has been suggested a U-shaped support pin which is formed from steel rod and the ends of which are secured in the stationary member as illustrated in U.S. Pat. No. 3,245,500 or U.S. Pat. No. 3,402,790. However, this U-shaped pin is not desirable because it is held only by one side portion of the stationary member as cantilever.

Accordingly, it is a primary object of the present invention to provide new brake shoe support pins which simplifies the construction of spot-type disk brakes, and are easy to assemble thereinto and economical to manufacture.

Further objects and advantages of this invention will be apparent from the following description, reference being had to the accompanying drawings wherein a preferred embodiment of the present invention is clearly shown.

Figure 2:
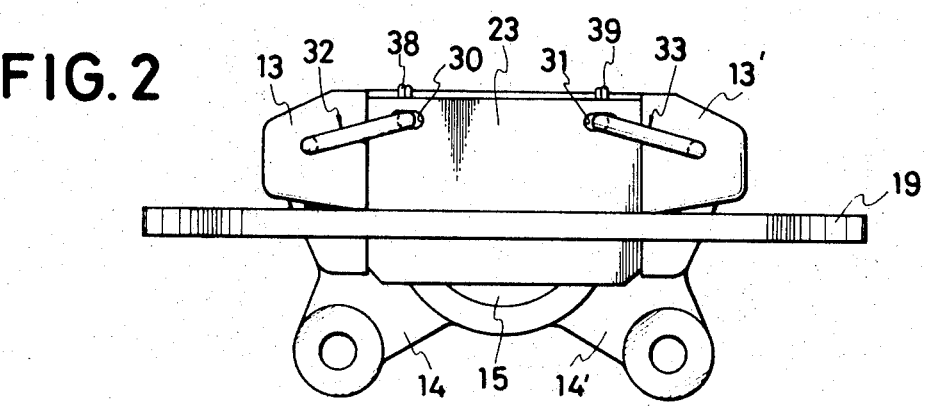

In the drawings:

FIG. 1 is a plan view of a spot-type disk brake incorporating a pair of brake shoe support pins according to this invention, and FIG. 2 is a side elevational view, in the direction of the brake disk axis, of the disk brake shown in FIG. 1, although the brake disk is omitted therefrom.

Referring to FIGS. 1 and 2, a disk 10 is fixed to a rotating part (not shown) of a vehicle and constitutes a rotating brake disk. The flank surfaces of this disk 10 are squeezed, during braking, by a caliper-type clamping mechanism as will become apparent hereinafter which is supported on a stationary member (not shown) of the vehicle. A hydraulic cylinder 11 comprising a housing 12 and a pair of yoke member 13, 13' formed integrally therewith is fixed at projecting parts 14, 14' of the cylinder housing 12 to the stationary member by mounting means such as bolts (not shown). The cylinder housing 12 having two open ends is disposed on one side of the disk, and the yoke members 13, 13' extend in a straddling manner over the brake disk 10 to the other side thereof. Within the cylinder housing 12, there are slidably fitted two opposed pistons 15 and 16. One piston 15 is directly engaged with a first brake shoe 17 while the other piston 16 is engaged with one inner edge 18 of a movable member 19 of closed-ring shape having an opposite inner edge 20 which is engaged with a second brake shoe 21 facing the other braking surface of the disk 10.

The first and second brake shoes 17 and 21 comprise backing plates 22 and 23, and friction linings 24 and 25 secured thereto, respectively, and slidably positioned by guide surfaces 26 and 27 of the yoke members 13, 13'. At the time of braking, the brake shoes 17 and 21 receive brake-clamping force respectively from the pistons 15 and 16 and inner edge 20 through backing plates 22 and 23, which are slidably guided by the surfaces 26 and 27 which prevent movement of the brake shoes in the direction of rotation of the disk 10.

The inner backing plate 22 is provided with two slots 28 and 29 which are located near the outer edges thereof and are elongated substantially in the horizontal direction while the outer backing plate 23 also is provided with two elongated slots 30 and 31 corresponding to those of backing plate 22. A pair of substantially J-shaped resilient pins 32 and 33 which are of circular cross sections and are symmetrically disposed relative to the brake disk axis, pass through the slots 28, 30 and the slots 29, 31 respectively for preventing movement of the brake shoes outwardly from the cylinder member 11 and for guiding the brake shoes in the brake disk axial direction when hydraulic pressure is applied or released. An inner end of the pin 32 is fixed in a hole (not shown) in the cylinder housing 12 whilst its outer end 34 is snapped into an opening 35 in yoke member 13 which is substantially parallel with the hole in housing 12. Similarly, an inner end of the other pin 33 is secured in another hole (not shown) in the housing while its outer end 36 is snapped into an another opening 37 in the yoke 13' also substantially parallel with the other hole in the housing 12. A pair of clips 38 and 39 are preferably provided at inner ends of the pins 32 and 33, respectively, to prevent axial movement of the pins. The pin 32 is curved at 40 to allow inserting of the outer end 34 thereof into the opening 35. Even if the curve of supporter 32 be formed roughly, in other words, without considerable accuracy, the supporter may be bent to fit into the opening 35 in the yoke member 13. It should be noted that it is possible to bend the support pins by suitable force. The construction of the other pin 33 is the same as the pin 32, so a description thereof is be omitted.

The torque on the brake shoes is absorbed by the guide surfaces 26 and 27 of the yoke members 13 and 13', not by the pins 32 and 33, because of the horizontally elongated slots so that the support pins do not require great hardness or strength and they may be easily and economically manufactured.

I claim:

1. In a disk brake for a rotatable disk having friction surfaces thereon and including a housing for an operating cylinder on one side of the brake disk for operating a pair of brake shoes disposed on opposed sides of the brake disk, a pair of yoke members fixed to a stationary member of the vehicle and extending from one side of the brake disk to the opposite side, the pair of brake shoes being disposed between the pair of yoke members whereby torque created when the brake shoes are applied to the brake disk during braking action, is absorbed, the improvement comprising a pair of substantially J-shaped supporting pins, the longer legs thereof passing through openings provided in the brake shoes, said pins supporting and axially guiding the brake shoes during application of the brakes, said pins being symmetrically disposed with respect to the axis of the brake disk, the ends of the long and short legs of said pins being mounted and secured respectively to stationary members on opposite sides of the brake disk.

2. In a disk brake as claimed in claim 1 in which the yoke members are formed integrally with the housing for the operating cylinder, the improvement wherein the ends of the legs of the supporting pins are secured respectively to the housing and each yoke member.

3. In a disk brake as claimed in claim 1 the improvement wherein the openings in the backing plates of the brake shoes are slots elongated substantially in a horizontal direction.

4. In a disk brake as claimed in claim 1 the improvement wherein the supporting pins are resilient.

5. In a disk brake as claimed in claim 1 the improvement wherein the supporting pins have circular cross sections.

* * * * *